United States Patent [19]

Mainprice

[11] Patent Number: 4,604,825
[45] Date of Patent: Aug. 12, 1986

[54] TREE CRADLE

[76] Inventor: Walter H. Mainprice, R.R. #1, Sunderland, Ontario, Canada, L0C 1H0

[21] Appl. No.: 692,991

[22] Filed: Jan. 22, 1985

[51] Int. Cl.⁴ ............................................. A01G 23/04
[52] U.S. Cl. ....................................... 47/76; 37/2 R; 47/78
[58] Field of Search ............................ 47/73, 75-76, 47/78; 37/2 R

[56] References Cited

U.S. PATENT DOCUMENTS

| | | | |
|---|---|---|---|
| 1,776,375 | 9/1930 | Russell | 47/73 |
| 2,022,607 | 11/1935 | Sorensen | 47/76 |
| 3,134,196 | 5/1964 | Hansen | 47/76 X |
| 3,979,856 | 9/1976 | Belcher | 47/76 |
| 4,062,148 | 12/1977 | Edmonds et al. | 47/78 X |
| 4,250,664 | 2/1981 | Remke | 47/76 |

FOREIGN PATENT DOCUMENTS

| | | | |
|---|---|---|---|
| 2505674 | 8/1976 | Fed. Rep. of Germany | 47/76 |
| 255727 | 4/1930 | Italy | 47/78 |

Primary Examiner—Robert E. Bagwill
Attorney, Agent, or Firm—Sim & McBurney

[57] ABSTRACT

A cradle for use in transplanting and transporting trees includes a body with an upper rim and two main strap members diametrally opposed and extending downwardly from the rim to terminate at a bottom wall. Auxiliary upright straps extend between the bottom wall and the upper rim, and each main strap has at the top a handle which defines an open ended sleeve parallel with the bottom wall, so that carrying rods can be inserted through the handles to facilitate manipulation.

6 Claims, 5 Drawing Figures

TREE CRADLE

This invention relates generally to the area of growing and transplating trees, and has to do particularly with the provision of a cradle which can be placed into the ground at the nursery where the tree is initially grown from a seedling, and then can be used to remove the tree from the ground and to transport the tree to its final location for planting.

GENERAL DESCRIPTION OF THIS INVENTION

An aim of one aspect of this invention is to provide a means for avoiding the necessity to hand-dig small trees and the like for transplanting. Another aim is to avoid having to lift a young tree through mechanical devices around its trunk.

Accordingly, this invention provides a cradle for use in transplanting and transporting trees, comprising:

a body having an upper rim member in the shape of a closed loop, two main strap members integral with said rim member at opposed locations thereon and extending downwardly therefrom to terminate at bottom edges, a bottom wall disposed between said bottom edges and integral therewith, auxiliary strap members extending between the bottom wall and the upper rim member, a handle at the top of each main strap member and integral therewith, each handle defining an open ended sleeve parallel with the bottom wall, whereby carrying poles can be inserted through the handles to facilitate manipulation of the cradle, each handle being disposed to the outside of its respective main strap member, the cradle further including reinforcement web means between each handle and its respective main strap member.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
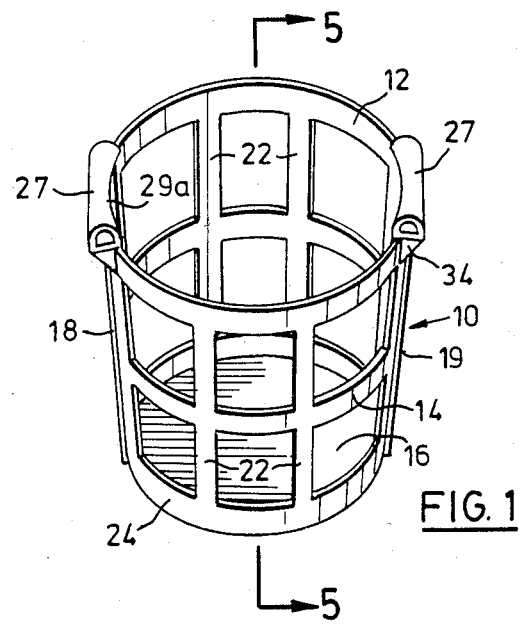
FIG. 1 is a perspective view of a cradle constructed in accordance with this invention.

Attention is first directed to FIG. 1, which shows a cradle generally at 10, for use in transplanting and transporting trees. The cradle consists essentially of a body consisting of an upper rim member 12 in the shape of a closed circular loop, an intermediate hoop member 14 below the rim member 12, a bottom wall 16 below the hoop member 14, two main strap members 18 and 19 located at opposed locations of the rim member 12 and extending downwardly therefrom to terminate at bottom edges coincident with the bottom wall 16. The cradle further incorporates four auxiliary upright strap members 22 which also extend between the bottom wall 16 and the rim member 12. The auxiliary strap members 22 and the main strap members 18 and 19 are all integral with the rim member 12 and with the hoop member 14. At the bottom, all strap members 18, 19 and 22 are integral with a rim 24 which is upstanding around the periphery of the bottom wall 16. In the embodiment shown, the bottom wall 16 is substantially circular, as are the hoop member 14 and the rim member 12.

Figure 2:
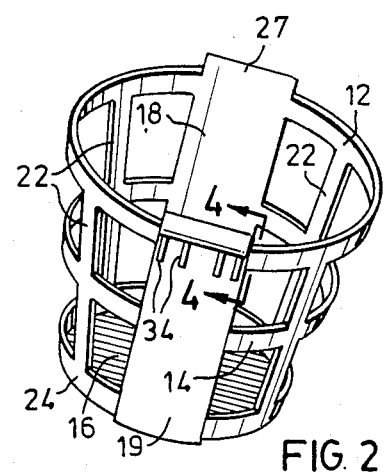
FIG. 2 is another perspective view of the cradle of FIG. 1, taken from a different angle.
Figure 5:
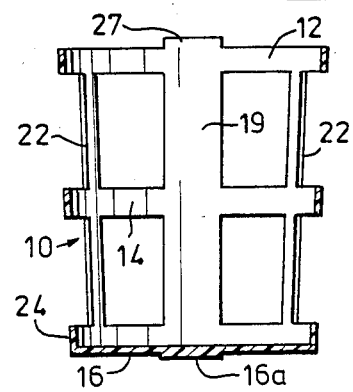
FIG. 5 is a sectional view taken at the line 5—5 in FIG. 1.

As seen in FIGS. 1, 2 and 5, the main strap members 18 and 19 are somewhat thicker than the auxiliary strap members 22, and the bottom wall 16 has an integral thickened portion 16a which bridges diametrally between the bottoms of the main strap members 18 and 19, and is of course integral therewith. This provides a very strong U-shaped reinforcing mechanism consisting of the main strap members 18 and 19 and the thickened portion 16a at the bottom wall 16, to add strength to the cradle.

The actual lifting of the cradle is intended to be done at the tops of the two main strap members 18 and 19, and for this purpose there is provided, at the top of each main strap member and integral therewith, a handle 27 which defines an open ended sleeve formation which is parallel with the bottom wall 16. The handles 27 have a horizontal length substantially equal to the lateral width of the main strap members 18 and 19. Since the latter are conically and concavely curved at the inside edge, in order to merge smoothly with the general roundedness of the cradle, it is appropriate to make the handles in such a way as to incorporate this curvature. In FIG. 4, which shows one of the handles 27 in end view and which is a section through the rim member 12, it can be seen that the opening passing through the handle 27 has a narrowed or restricted central portion 29, due to the inward curvature, which can be best seen in FIG. 1 at the numeral 29a. Nonetheless, the minimal aperture provided within the handle 27 is large enough to accept an iron rod or pipe, if desired, in the manner of FIG. 3. In addition, the wider end portions provide a tapered guide to facilitate entry of the rods, particularly if these are connected to a fork-lift mechanism or the like.

Again with reference to FIG. 4, it will be seen that the handle 27 has a substantially flattened bottom wall 31, and a rounded upper portion 32. The flattened bottom wall 31 of the handle 22 facilitates hand gripping under the handle. It will also be noted that each handle 27 is disposed "outboard" of the cradle itself, i.e. to the outside of its respective main strap member 18, 19. Further, as seen in FIG. 4, the cradle includes a plurality of reinforcement webs 34 of triangular configuration extending between the bottom wall 31 of each handle 27 and the respective main strap member 18, 19.

The bottom wall 31 of the handle 27 slopes outwardly and slightly downwardly, to allow a positive grip for manoevring.

Preferably, and as shown in the illustrated embodiment, the bottom wall 16 has a smaller diameter than the upper rim member 12, whereby the main and auxiliary strap members converge downwardly to provide a generally frusto-conical configuration.

Figure 3:
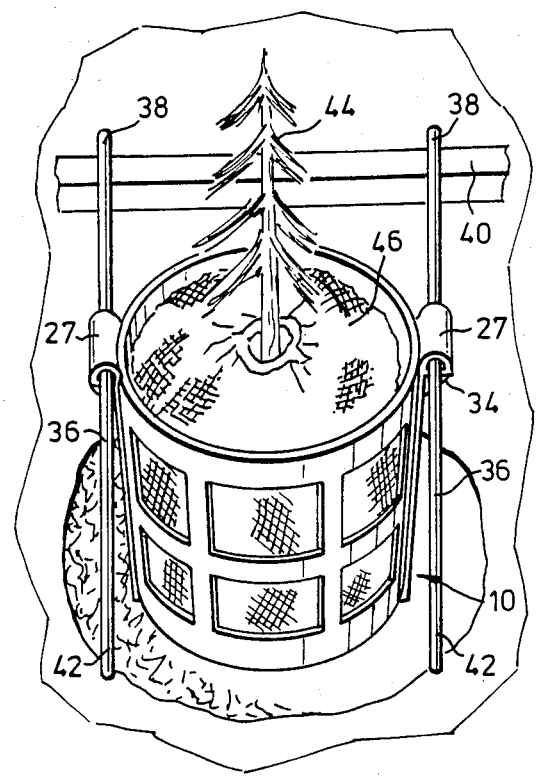
FIG. 3 is a perspective view of the cradle of this invention when in use.
Figure 4:
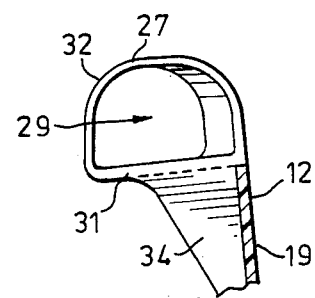
FIG. 4 is an enlarged sectional view taken at the line 4—4 in FIG. 2, showing the handle in end view.

FIG. 3 illustrates the cradle in use. Two iron rods 36 have been inserted through the respective handles 27, and the ends 38 of the rods rest on a support pad 40 of any suitable kind. This may be concrete blocks, a length of lumber placed on the ground, or whatever.

The rods 36 allow a single man to obtain considerable leverage, by lifting up on the nearer ends 42 of the rods 36. Depending upon the placement of the handles 27 along the rods 36, a single individual may achieve up to three times his normal lift, in terms of the mechanical advantage of the lever principle. In FIG. 3, a tree 44 is seen growing inside a suitable bag 46 within the cradle 10. The bag is preferably a non-biodegradable, porous, root-limiting material capable of constraining root growth to one side of itself. A suitable such material would be a geotextile made from polypropylene. In use, a cradle 10 would first be inserted into a hole dug in the ground at the nursery, then a bag 46 would be arranged within the cradle 10. Alternatively, the cradle could be supplied with a permanent or insert-type liner of this same material, covering the side wall openings only. Next, the cradle and liner would be filled with earth and a seedling would be planted in the centre. The porous nature of the bag would allow moisture and nutrients to reach the root system of the seedling, but the liner itself, due to its particular pore size, would prevent large root growth beyond the bag, and would force the root system to elaborate itself within the bag only.

When the seedling had grown to the point where it was ready to be sold and transplanted, the cradle 10, the bag 46 (or liner), the contained earth and the tree would be removed from the ground using the rods 36 as described earlier with respect to FIG. 3. Alternatively, a mechanical lifting device could be employed.

The tree could then be carried by two men, one at either end of the rods 36, to a waiting dolly, truck, or other transportation means. Conversely, a mechanical lifting device could not only lift the cradle from the ground, but transport it as well.

It will be appreciated that the cradle can be manufactured from several suitable plastic compounds. One such would be linear polyethylene.

While one embodiment of this invention has been illustrated in the accompanying drawings and described hereinabove, it will be evident to those skilled in the art that changes and modifications may be made therein, without departing from the essence of this invention, as set forth in the appended claims.

What I claim is:

1. A cradle for use in transplanting and transporting trees, comprising:
   a body having an upper rim member in the shape of a closed loop, two main strap members integral with said rim member at opposed locations thereon and extending downwardly therefrom to terminate at bottom edges,
   a bottom wall disposed between said bottom edges and integral therewith,
   auxiliary strap members extending between the bottom wall and the upper rim member,
   a handle at the top of each main strap member and integral therewith, each handle defining an open ended sleeve parallel with the bottom wall, whereby carrying poles can be inserted through the handles to facilitate manipulation of the cradle, each handle being disposed to the outside of its respective main strap member, the cradle further including reinforcement web means between each handle and its respective main strap member.

2. The invention claimed in claim 1, in which both the upper rim member and the bottom wall are substantially circular, the bottom wall having a smaller diameter than the upper rim member, whereby the main and auxiliary strap members converge downwardly, the bottom wall having an integral thickened portion bridging diametrally between the bottom edges of the main strap members.

3. The invention claimed in claim 1, in which each handle has a substantially flattened bottom wall and a rounded upper portion, the bottom wall sloping outwardly and slightly downwardly, thereby to facilitate hand gripping under the handle.

4. The invention claimed in claim 2, in which each handle has a substantially flattened bottom wall and a rounded upper portion, the bottom wall sloping outwardly and slightly downwardly, thereby to facilitate hand gripping under the handle.

5. The invention claimed in claim 4, which further incorporates an integral hoop member between the bottom wall and the upper rim member.

6. The combination of the cradle claimed in claim 1 and a porous, non-biodegradable, root-limiting bag, the bag fitting within the cradle and being capable of retaining earth while constraining root growth within the bag.

* * * * *